United States Patent
Katz et al.

(10) Patent No.: US 7,230,928 B2
(45) Date of Patent: Jun. 12, 2007

(54) DATA TRANSFER METHOD

(75) Inventors: Marcos Katz, Oulu (FI); Juha Ylitalo, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/268,099

(22) Filed: Oct. 10, 2002

(65) Prior Publication Data

US 2003/0076787 A1    Apr. 24, 2003

Related U.S. Application Data

(63) Continuation of application No. PCT/FI01/00348, filed on Apr. 9, 2001.

(30) Foreign Application Priority Data

Apr. 10, 2000    (FI) ................................. 20000853

(51) Int. Cl.
*H04Q 7/20*    (2006.01)

(52) U.S. Cl. ...................... 370/252; 370/332; 455/423; 455/439; 455/452.1

(58) Field of Classification Search ............... 370/310, 370/311, 317, 318, 331, 332, 333, 334, 252; 455/277.1, 277.2, 278.1, 279.1, 421, 422, 455/423, 436, 439, 442, 440, 441, 446, 452.1, 455/452.2, 562.1
See application file for complete search history.

(56) References Cited

U.S. PATENT DOCUMENTS

| | | | | |
|---|---|---|---|---|
| 5,548,837 A | * | 8/1996 | Hess et al. ................ | 455/278.1 |
| 5,696,798 A | * | 12/1997 | Wright et al. ............... | 375/345 |
| 5,856,804 A | | 1/1999 | Turcotte et al. ............. | 342/371 |
| 5,886,987 A | | 3/1999 | Yoshida et al. ............. | 370/318 |
| 5,982,766 A | | 11/1999 | Nystrom et al. ............ | 370/347 |
| 6,085,076 A | * | 7/2000 | Lindsay et al. ........... | 455/277.1 |
| 6,188,697 B1 | * | 2/2001 | Umehira et al. ............ | 370/412 |
| 6,374,085 B1 | * | 4/2002 | Saints et al. ................. | 455/69 |
| 6,782,035 B1 | * | 8/2004 | Nakamura et al. .......... | 375/130 |
| 6,799,059 B1 | * | 9/2004 | Austin et al. ............... | 455/561 |
| 2001/0041537 A1 | * | 11/2001 | Simonsson et al. ........ | 455/67.1 |
| 2002/0034943 A1 | * | 3/2002 | Pallonen ..................... | 455/424 |

FOREIGN PATENT DOCUMENTS

| | | |
|---|---|---|
| EP | 969 624 | 1/2000 |
| EP | 987 842 | 3/2000 |
| FI | 961673 | 10/1997 |
| WO | WO 99/40689 | 8/1999 |
| WO | WO 00/36764 | 6/2000 |
| WO | WO 00/72464 | 11/2000 |

* cited by examiner

*Primary Examiner*—Hassan Kizou
*Assistant Examiner*—Shick Hom
(74) *Attorney, Agent, or Firm*—Pillsbury Winthrop Shaw Pittman LLP

(57) ABSTRACT

The invention relates to a radio system including transceivers. One of the transceivers includes, for instance, a device for comparing a parameter representing signal quality measured from the received signal with at least one threshold value and a device for determining a quality class for the performance of a MIMO common channel. At least one of the transceivers includes a device for storing the observations made by the second transceiver about the quality class transitions of the transfer channel of the first transceiver and a device for estimating the next quality class of the transfer channel of the first transceiver from the stored quality class transition observations.

45 Claims, 4 Drawing Sheets

DATA TRANSFER METHOD

FIELD OF THE INVENTION

This application is a continuation of international application PCT/FI01/00348 filed Apr. 09, 2001, which designated the US and was published under PCT article 21(2) in English.

The invention relates to a method of increasing spectral efficiency and improving the performance of a radio link, particularly in transmission of high-rate packet data, for example in the Internet.

BACKGROUND OF THE INVENTION

The use of multiple antenna systems, such as array antennas, in radio communication applications is of interest because of the increased performance achieved with these systems. These systems are also called MIMO systems (Multiple Input—Multiple Output), i.e. multi-channel systems.

Methods utilizing multiple antenna systems for implementing time and space diversity have been developed to achieve as high a link gain as possible. One such method is the Space-Time Transmit Diversity method (STTD). In the space-time transmit diversity method, a signal is transmitted continuously to a subscriber terminal using at least two different antennas. The signal transmitted via the different antennas is different. There are two ways to implement the dissimilarity: time-space trellis codes and time-space block codes. In trellis coding, a trellis diagram is used, wherein each possible state and branches from it to other states are expressed by two symbols. When the initial state of the trellis is known, the bits to be coded can be expressed in the trellis diagram by symbols indicating the transitions to be made between different levels. The obtained symbols are then distributed for transmission over different antennas.

The bits to be coded in space-time block codes are divided for example into two-bit sequences, of which the symbols to be transmitted are generated so that the symbol to be transmitted over a first antenna is generated from a first bit and the complex conjugate of a second bit, and the symbol to be transmitted over a second antenna is generated from a second bit and the complex conjugate of the first bit.

The third and subsequent generations of mobile systems provide a chance to adapt the transfer rate according to the information to be transferred: speech is transferred at a lower rate, data at a faster rate and multimedia applications use the highest transfer rate. High transfer rates usually also require high transmission power in order to ensure the required quality on the connection. However, performance on the transmission path is affected not only by compensation for the effects of a multipath propagation environment, but also for example the spectral efficiency of the transmission, i.e. the achievement of the required quality at as low a use of radio resources as possible, typically at as low a transmission power as possible. Besides requiring less current, low transmission power also interferes less with other system signals.

The problem is to find as good a spectral efficiency as possible in multiple antenna systems, particularly at high transfer rates, for example in packet data transfer in the Internet.

BRIEF DESCRIPTION OF THE INVENTION

The object of the invention is thus to provide a method and equipment for implementing the method so as to achieve as good spectral efficiency and radio link performance as possible in multiple antenna systems at high transfer rates. This is achieved with a data transfer method in a radio system comprising a first transceiver and a second transceiver, of which at least the first transceiver comprises a multiple antenna system, in which method a signal transmitted by the first transceiver is measured by the second transceiver, and in which method one or more threshold values are set on the performance of the transfer channel. The method of the invention comprises comparing a parameter value representing the quality of the signal measured by the second transceiver from the signal it received with one or more threshold values, and thus determining a quality class for the performance of a MIMO common channel, the determined quality class being coded by the second transceiver, the second transceiver transmitting information on the quality class to the first transceiver, and determining the transmit parameters of the antenna elements of the multiple antenna system used by the first transceiver for transmission based on the quality class information.

The invention also relates to a data transfer method in a radio system comprising a first transceiver and a second transceiver, of which at least the first transceiver comprises a multiple antenna system, in which method a signal transmitted by the first transceiver is measured by the second transceiver, and in which method one or more threshold values are set on the performance of the transfer channel. The method of the invention comprises comparing a parameter value representing the quality of the signal measured by the second transceiver from the signal it received with one or more threshold values, and thus determining a quality class for the performance of a MIMO common channel, coding the determined quality class by the second transceiver, the second transceiver transmitting information on the quality class to the first transceiver, storing the observations made by the second transceiver about the quality class transitions of the transmission radio channel of the first transceiver, estimating the next quality class of the transmission radio channel of the first transceiver from the stored quality class transition observations, and determining the transmit parameters of the antenna elements of the multiple antenna system used by the first transceiver for transmission based on the estimate.

The invention also relates to a data transfer method in a radio system comprising a first transceiver and a second transceiver, of which at least the first transceiver comprises a multiple antenna system, in which method a signal transmitted by the first transceiver is measured by the second transceiver, and in which method one or more threshold values are set on the performance of the transfer channel. The method of the invention comprising comparing a parameter value representing the quality of the signal measured by the second transceiver from the signal it received with one or more threshold values, and thus determining a quality class for the performance of a MIMO common channel, coding the determined quality class by the second transceiver, storing the observations made by the second transceiver about the quality class transitions of the transmission radio channel of the first transceiver, estimating the next quality class of the transmission radio channel of the first transceiver from the stored quality class transition observations, the second transceiver transmitting the quality class estimate to the first transceiver, and determining the transmit parameters of the antenna elements of the multiple antenna system used by the first transceiver for transmission based on the estimate.

The invention also relates to a radio system comprising a first transceiver having an associated multiple antenna system, in which radio system a second transceiver comprises means for measuring a received signal, and in which radio system at least one threshold value is set on the performance of the transfer channel. In the system of the invention, the second transceiver comprises means for comparing a parameter representing signal quality measured from the received signal with at least one threshold value, and means for determining a quality class for the performance of a MIMO common channel, the second transceiver comprises means for encoding the determined quality class, the second transceiver comprises means for transmitting quality class information to the first transceiver, the first transceiver comprises means for determining the transmit parameters of the antenna elements of the multiple antenna system used by the first transceiver for transmission based on the quality class.

The invention also relates to a radio system comprising a first transceiver having an associated multiple antenna system, in which radio system a second transceiver comprises means for measuring a received signal, and in which radio system at least one threshold value is set on the performance of the transfer channel. In the system of the invention, the second transceiver comprises means for comparing a parameter representing signal quality measured from the received signal with at least one threshold value, and means for determining a quality class for the performance of a MIMO common channel, the second transceiver comprises means for encoding the determined quality class, at least one of the transceivers comprises means for storing the observations made by the second transceiver about the quality class transitions of the transfer channel of the first transceiver, at least one of the transceivers comprises means for estimating the next quality class of the transfer channel of the first transceiver from the stored quality class transition observations, the second transceiver comprises means for transmitting quality class information or a quality class estimate to the first transceiver, the first transceiver comprises means for determining the transmit parameters of the antenna elements of the multiple antenna system used by the first transceiver for transmission based on the quality class.

The preferred embodiments of the invention are disclosed in the dependent claims.

The method and system of the invention provide a plurality of advantages. The method of the invention improves spectral efficiency and radio link performance. The method also enables adaptation of the transfer rate according to the information to be transferred. The method also enables the choice of a diversity antenna or only one antenna in transmission, allowing the diversity antenna to be used for example for the transmission of other data. The method also enables the choice of the number of antenna elements in an antenna array to be used for transmission. Furthermore, the method enables a decrease in the number of antennas of a radio system network part, such as a base station, used for transmission, and a decrease in the number of receiver branches in a subscriber terminal. The transfer of measurement data made by the subscriber terminal from a received signal also requires fewer bits and, consequently, less time, as the measurement data are encoded into quality class data, thus allowing more actual data to be transmitted. A further advantage is that the obtained quality class data can be utilized in the choice of transmit parameters, such as weighting coefficients used for antenna beam formation when utilizing multiple antenna systems.

In the storage of observations about quality class transitions in a radio channel, measurements by the subscriber terminal can be made less often, since the base station is able to calculate statistically what the radio channel is likely to be after a coherence time (the time the radio channel remains unchanged). This enables the transmission of more actual data.

BRIEF DESCRIPTION OF THE FIGURES

In the following, the invention will be described in detail in connection with preferred embodiments with reference to the accompanying drawings, in which.

DESCRIPTION OF THE EMBODIMENTS

Figure 1:
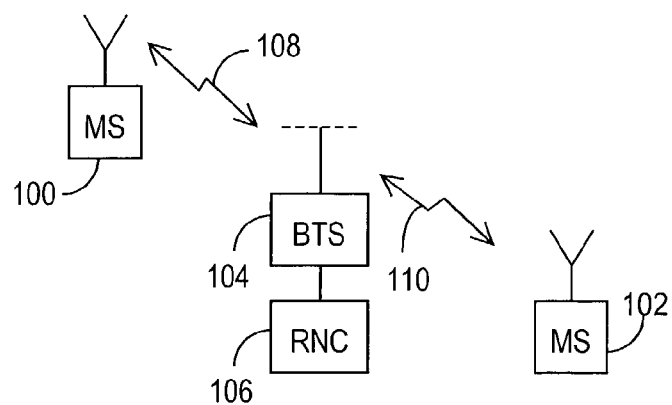
FIG. 1 illustrates an example of a telecommunication system.

FIG. 1 schematically shows a digital data transfer system, to which the solution of the invention is applicable. The system is a cellular radio system comprising a base station 104 that is in a bi-directional connection 108 and 110 with subscriber terminals 100 and 102 that are fixedly mounted, vehicle-mounted or hand-held portable terminals. The base station comprises transceivers that communicate with an antenna unit for implementing a bi-directional connection to the subscriber terminal. The base station communicates with a base station controller 106 that switches the connections of the terminals to other parts of the network. Several base stations communicating with the base station controller are controlled by it in a centralized manner. A control unit in the base station controller attends to call control, mobility management, gathering statistics, and signalling.

From a cellular radio system, a connection may exist also to a public telephone network, whereby a transcoder comprised by the system converts the different digital speech encoding forms used between the public telephone network and the cellular radio network into a form suitable for one another, for example from the 64-kbps form of the fixed network to another form of the cellular radio network (e.g. 13 kbps), and vice versa.

Figure 2A:
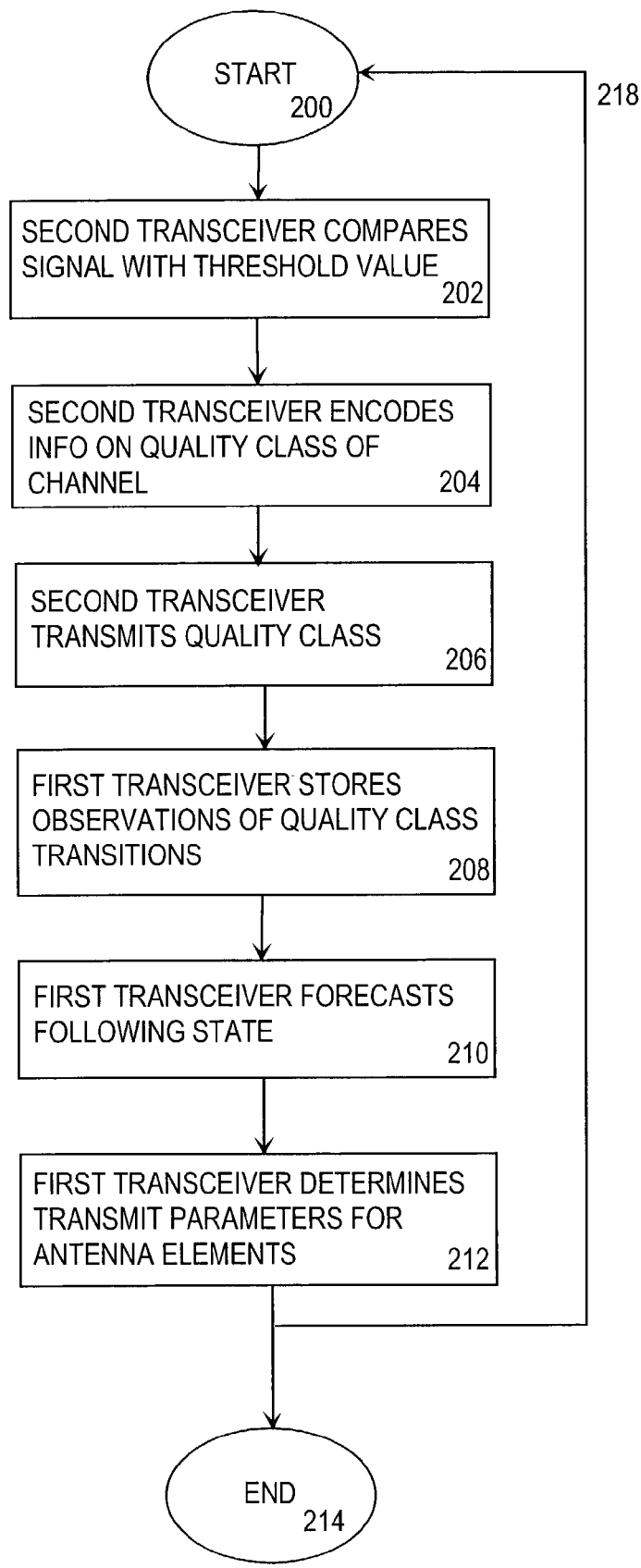
FIGS. 2a–b show a flow chart, FIG. 3 schematically shows the structure of a subscriber terminal, FIGS. 4a–b schematically show a structure of a transceiver located in a network part.

FIG. 2a shows a flow diagram of method steps required for increasing spectral efficiency when a first transceiver in a system is a network part, e.g. a base station, and a second transceiver is a subscriber terminal. It should be noted that the method is also applicable when the first transceiver is a subscriber terminal and the second a network part. The method starts at block 200. In block 202, the subscriber terminal compares a signal transmitted by a base station with a threshold value stored in advance in a subscriber terminal. There may be one or more threshold values. The more exact the determination of the signal quality class is to be, the more threshold values there should naturally be, since the threshold values are required to separate the different quality classes from each other.

In determining the quality of a MIMO channel, i.e. the common channel formed by channels 1 and 2 in the example shown, the subscriber terminal utilizes for example a pilot signal transmitted by a network part in the radio system, such as a base station, or a known symbol sequence. The attempt is to select the pilot signals transmitted by each antenna element such that they are mutually orthogonal, i.e. do not correlate. Measurements, such as calculation of bit error ratio values, determination of signal-to-interference ratio (SIR) or determination of received signal power, performed at present by a subscriber terminal, may be utilized in the determination of the quality of the signal received by the subscriber terminal.

After threshold value comparison, the state of the common channel is determined in block 204 and the quality class is encoded. The following table shows a simple example of this. In this situation, a network part in a radio system uses two antenna elements or antennas for transmission, and a subscriber terminal receives with one antenna element or an antenna. In the table, FCSC refers to Finite Channel State Classification information, which is an encoded quality class, or state determination, of the common channel. Thus, FCSC refers to a quality class encoding method.

| Quality of channel | FSCS | Quality class |
|---|---|---|
| Channel 1 good and channel 2 good | 11 | $S_1$ |
| Channel 1 bad and channel 2 good | 01 | $S_2$ |
| Channel 1 good and channel 2 bad | 10 | $S_3$ |
| Channel 1 bad and channel 2 bad | 00 | $S_4$ |

First, the accuracy of the indication of the quality class of the common channel is to be determined. In the example in the table, for the sake of simplicity, only four different quality classes $S_1$, $S_2$, $S_3$ and $S_4$ are used. The application of the method does not restrict the number of quality classes, which can be selected suitable depending on the application, based on how many channels the MIMO system comprises, how accurately the signal quality class is to be determined, i.e. the number of quality class threshold values, and how many bits are usable for indicating the quality class. The encoding needed in the example of the table is very simple binary coding: 1 means a good channel and 0 a bad channel. The coding method can also be selected as desired application-specifically.

In block 206, the subscriber terminal sends the encoded quality class information to a network part of the radio system, such as a base station. Transmission is not necessarily continuous, but may also take place periodically.

In block 208, the observations regarding quality class transitions transmitted by the subscriber terminal are stored in a memory buffer in the network part. Constant K expresses the number of different quality classes. A transition probability matrix TMP is calculated, which in this case is a KxK matrix, whose elements are composed of the probabilities of different state transitions. Variables $P_{ij}$ express the probability of a transition from state i to state j, i.e. from quality class i to quality class j. This yields the matrix $$P = \begin{bmatrix} p_{11} & p_{12} & \cdots & p_{1j} \\ p_{21} & p_{22} & \cdots & p_{2j} \\ \vdots & \vdots & \vdots & \vdots \\ p_{i1} & p_{i2} & \cdots & p_{ij} \end{bmatrix},$$

wherein 0<p<1.

Generally, $$p_{ij}(n) = \frac{\text{number of transitions } S_i \Rightarrow S_j \text{ in last } n \text{ observations}}{\text{number of transitions } S_i \Rightarrow \text{ in last } n \text{ observations}}$$

i.e. the number of transitions from a quality class, i.e. state $S_i$ to quality class $S_j$, in the last n observations divided by the number of all transitions from quality class $S_i$ in the last n observations.

The transition probability matrix can be preferably updated after transmission of quality class determination information by each subscriber terminal or less frequently. Let us assume that, based on quality class determination information, the following channel quality class is $S_j$, wherein j=1,2, . . . , K, and the previous quality class determination information was $S_i$, wherein i=1,2, . . . , K. In this case, the transition probability matrix is updated such that all dividers on the $i^{th}$ row are incremented by one and the dividend of the $j^{th}$ element is incremented by one.

The observations stored in block 210 can be used for a statistical prognosis about the most probable subsequent radio channel quality class. For example, if the following radio channel quality class is good at a very high probability, i.e. in this example $S_1$, it is preferable to use several antenna elements for transmission (both of them in the exemplary system). When packet data is concerned, it is preferable to send a plurality of data packets. In addition, multiple-layer modulation may be used and thus increase the transfer rate. A lighter encoding or no encoding at all may also be used, which also increases data transfer rate.

If the following is a bad quality class at a high probability, i.e. in the example $S_4$, is it preferable to wait for the channel to improve, e.g. the duration of the coherence time of the channel, before starting transmission. This way no attempts are made to transmit at a high power thus interfering with other users of the system. A more efficient encoding or modulation method may also be used, which only comprises a few levels, e.g. binary modulation only comprises two levels.

If one of the channels in the exemplary case is good and the other bad, weighting of the input signals of the antenna elements can for example be used, favouring the better antenna element.

If the probability of the following quality class being good ($S_1$) is low, the network part in the radio system should preferably arrange its transmissions for example when packet data is concerned such that data transfer requiring a high transfer rate is not transmitted until information about an improvement of the channel is received.

If the probability of the following channel quality class being bad ($S_4$), in turn, is low, then data requiring a high data transfer rate can be transmitted. In a situation where one channel is bad, the other good, weighting of the input signals of the antenna elements can for example be used, favouring the better antenna element.

In block 212, the transmit parameters of the antenna elements used for transmission are determined, preferably transmission power. If zero power is selected, said antenna element is not used. At this stage, the diversity combination to be used may also be selected, e.g. if diversity is used, and if so, what diversity antennas or diversity methods are used. The method ends at block 214. Arrow 218 shows how the method can be repeated when needed. Typically, the method is executed several times during transmission.

The method may also be simplified. Next, the method steps of a simpler embodiment will be described by means of FIG. 2b. Method steps 200 to 206 are similar to those described above, and will not be repeated. The embodiments described differ from one another in that in the embodiment shown in FIG. 2b, after block 206, the transmit parameters are determined for the antenna elements to be used for transmission, preferably transmission power 212. The method ends at block 214. This simpler application is faster, but is based at each particular time only on the latest channel quality class determination and is thus more susceptible to error values than the application according to FIG. 2a, which utilizes statistical analysis.

It should be noted that the above describes an embodiment wherein a first transceiver produces the described statistical class transition prognosis. The method is also applicable such that the second transceiver performs the statistical analysis and transmits the prognosis to the first transceiver.

Next, the subscriber terminal parts required for implementing the different application alternatives of a method of increasing spectral efficiency will be described by means of a simplified example.

Figure 3:
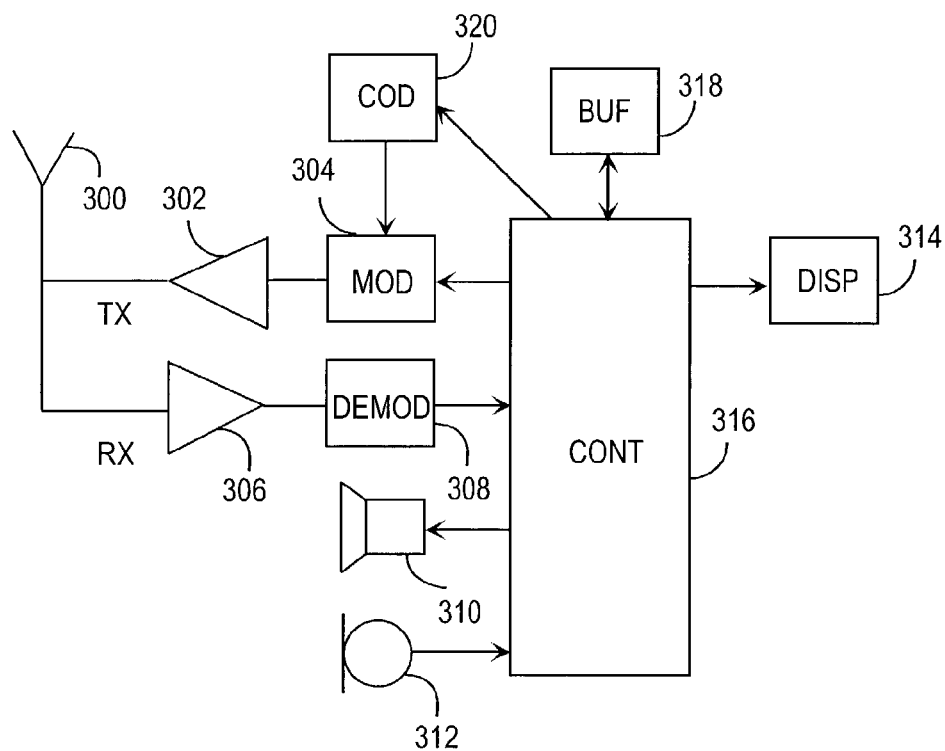
Figure 2B:
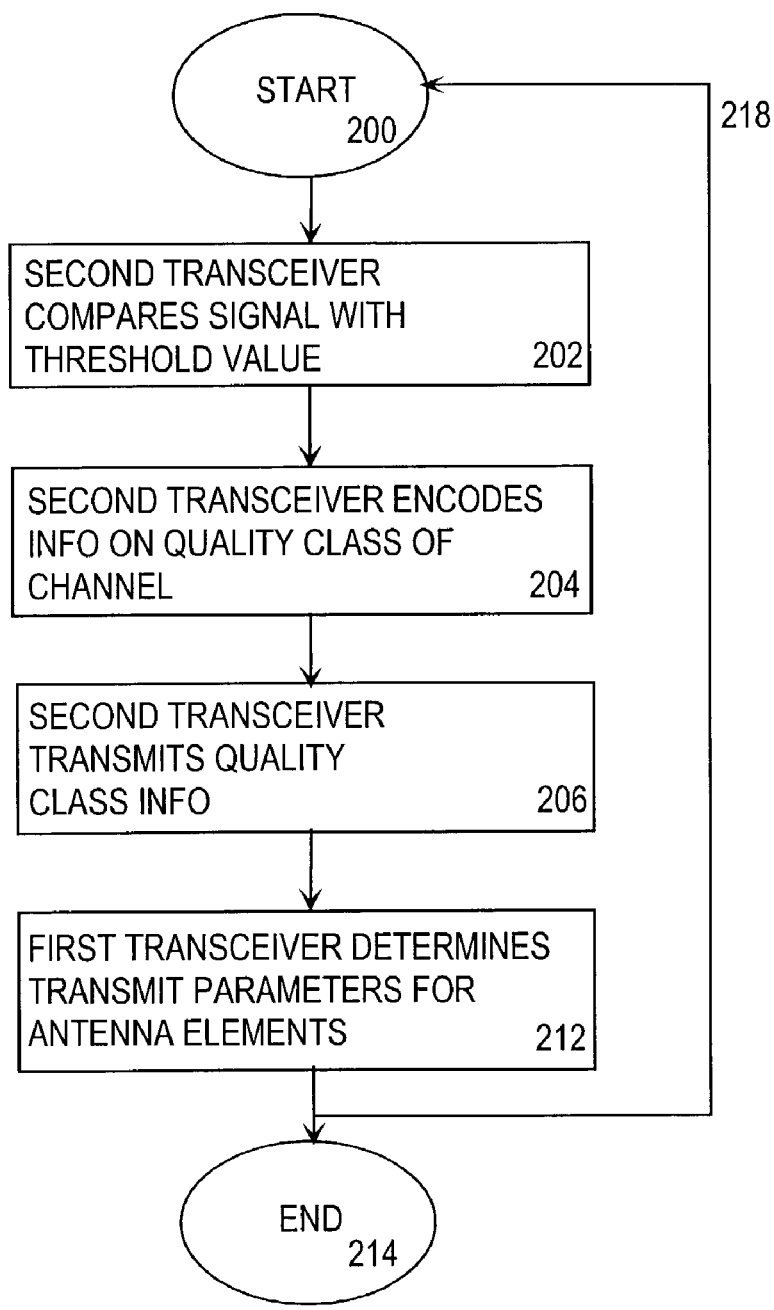

FIG. 3 illustrates a terminal for implementing the method shown in FIGS. 2a–b in a radio system. The transmitter of the subscriber terminal and the transmitter of a network part in the radio system partly perform the same tasks, which will be described in detail later when describing the structure of the transmitter of the network part. The terminal may be for example a portable telephone or a personal computer, without any restriction thereto. The terminal comprises an antenna 300 for transmitting and receiving signals via a duplex filter. The terminal may also comprise several antennas or a multiple antenna system. The terminal also comprises a transmitter 302 for amplifying and transmitting a modulated signal to the antenna, a modulator 304 for modulating the carrier with a data signal containing the desired information in accordance with the selected modulation method, a receiver 306 for amplifying a signal coming from the antenna and for down-converting it into a selected intermediate frequency or directly into the base frequency, a demodulator 308 for demodulating a received signal so that the data signal can be separated from the carrier.

The subscriber terminal also comprises a control block 316 for controlling the operation of the different parts of the terminal and performing necessary measures to process user speech or data generated by the user, such as DSP processing (Digital Signal Processing), D/A conversion and filtering. The control block also performs both encoding and decoding, such as channel and speech encoding. In addition, in spread spectrum systems, such as the WCDMA, a pseudo-random spreading code can be used to spread signal spectrum in the transmitter to a wide band and despread it in the receiver, thus aiming at increasing the capacity of the channel. The control block also adapts the signal and signalling information to be transmitted to make it conform to the air interface standard of the radio system used. The control block also comprises a program for controlling the operation of the terminal. The control block performs measurements, such as bit error ratio measurements and power measurement, required for quality class determination of the signal transmitted by a network part in the radio system. The control block also compares the measured value with the stored threshold value(s).

The terminal also comprises a buffer memory 318, wherein at least one predetermined quality class threshold value is stored. The quality class threshold values may also be changed. Typically, in the selection of a quality class threshold value, for example the radio environment, the radio system used and the number of antennas are taken into account. The quality class obtained by comparison is encoded for example as described in context with FIG. 2 or in some other suitable way in an encoding block 320. The encoded quality class definition is transmitted via the transmitter part of the subscriber terminal to a network part in the radio system.

The above-described functionalities of a terminal, such as the control block and the encoding block, can be implemented in many ways, for example by software executed with a processor or a hardware application, such as logics built from separate components or ASIC (Application Specific Integrated Circuit).

The user interface of the terminal comprises a speaker or an earpiece 310, a microphone 312, a display 314 and optionally a keyboard, which communicate with the control block.

Next, the parts of the transceiver structure of a network part of the radio system, such as a base station, required for implementing the alternative applications of the method of increasing spectral efficiency as described in FIGS. 2a–b will be discussed by means of the simplified examples in FIGS. 4a–b. The transceiver parts common to the embodiments presented herein will be described first.

A multiple antenna system, such as an antenna array, which is able to use directional antenna beams, comprises several separate, e.g. eight, antenna elements. There may be M antenna elements, M being an integer larger than one. For the sake of clarity, the figure only shows two, 400A, 400B. The same antenna elements as in transmission can be used in reception, or there can be a separate antenna element 400C for transmission in the manner shown in FIG. 2. The receiver may also comprise several antenna elements. The antenna element arrangement is for example linear or planar.

Linearly, the elements may be arranged for example as a ULA (Uniform Linear Array), wherein the elements are arranged at regular intervals on a straight line. Planar refers to for example CA (Circular Array), wherein the elements are arranged on the same plane for example horizontally in the form of the periphery of a circle. In this case a given portion of the periphery of the circle is covered, e.g. 120 degrees, even the entire 360 degrees. In principle, said uniplanar antenna structures can be used to build two-dimensional and even three-dimensional structures. A two-dimensional structure is formed for example by placing ULA structures in parallel, whereby the elements form a matrix.

A multipath propagated signal is received via the antenna elements. Each antenna element comprises a receiver, in the figure only one 402, which are radio frequency parts. The receiver of a network part in a radio system has to be able to receive and disassemble into a bit stream the data transmitted by a terminal about the quality class of the signal transmitted by a base station. Storage and processing of the quality class information in the transceiver of the network part in the radio system can also be placed on the receiver side 404, but in this example the structures carrying out said functions are placed on the transmitter side and will be described later in connection with the description of the transmitter structure.

The receiver 402 comprises a filter for elimination of frequencies outside the desired frequency band. The signal is then converted into an intermediate frequency or directly to the base frequency, in which form the signal is sampled and quantized in an analog/digital converter 406.

A demodulator 408 removes the carrier from the received signal and any spreading coding used in a spread spectrum system. The demodulation block also performs different signal processing tasks, such as channel decoding, deinterleaving and decryption.

The transmitter of the network part in the radio system comprises a modulation block 414 for modulating the carrier by a modulation method selected with a data signal including the desired information. The modulation block processes the user's speech or data generated by the user, such as DSP processing (Digital Signal Processing), which is used for example for encoding and encrypting information to be transmitted. In channel coding, systematic bit redundancy, typically parity bits, are added to the signal and used for error detection and correction in the decoder. In speech encoding, asymmetric redundancy is typically removed from source symbols to lower the required bit rate. In addition, in spread spectrum systems, such as WCDMA, the spectrum of a signal is spread by means of a pseudo-random spreading code to a wide band in the transmitter.

The transmitter comprises D/A converters 420 and 420a–b for converting a digital signal into analog. The transmitter also comprises RF parts 422 and 422a–b, in which the signal is up-converted to the selected transmission frequency. The RF parts also comprise filters, which in band-restricted systems restrict the bandwidth of the transmission in the transmitter and amplifiers for amplifying a signal to be transmitted to the selected power level.

The transmitter also adapts the signal to be transmitted and the signalling information so that they conform to the air interface standard of the radio system used.

Figure 4A:
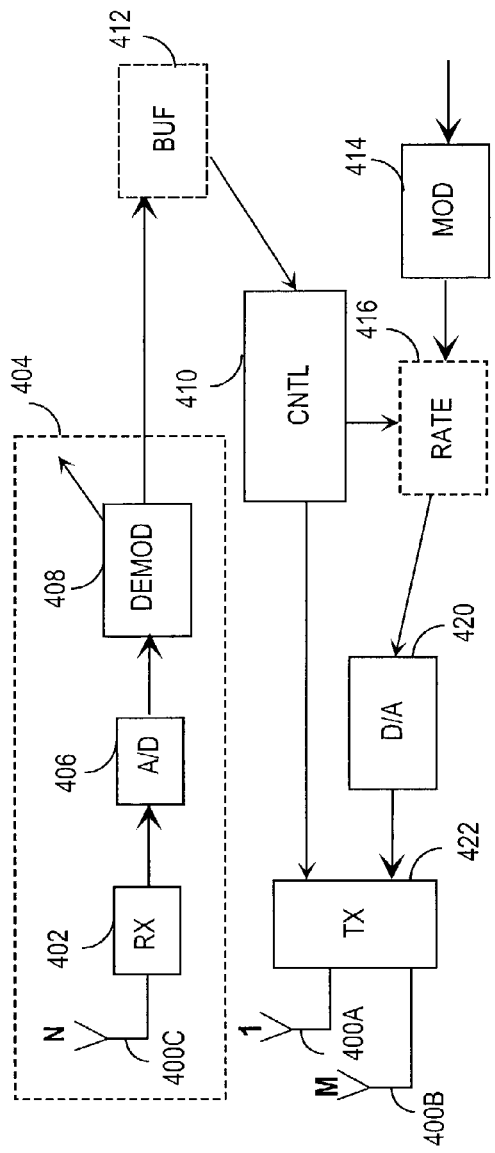
Figure 4B:
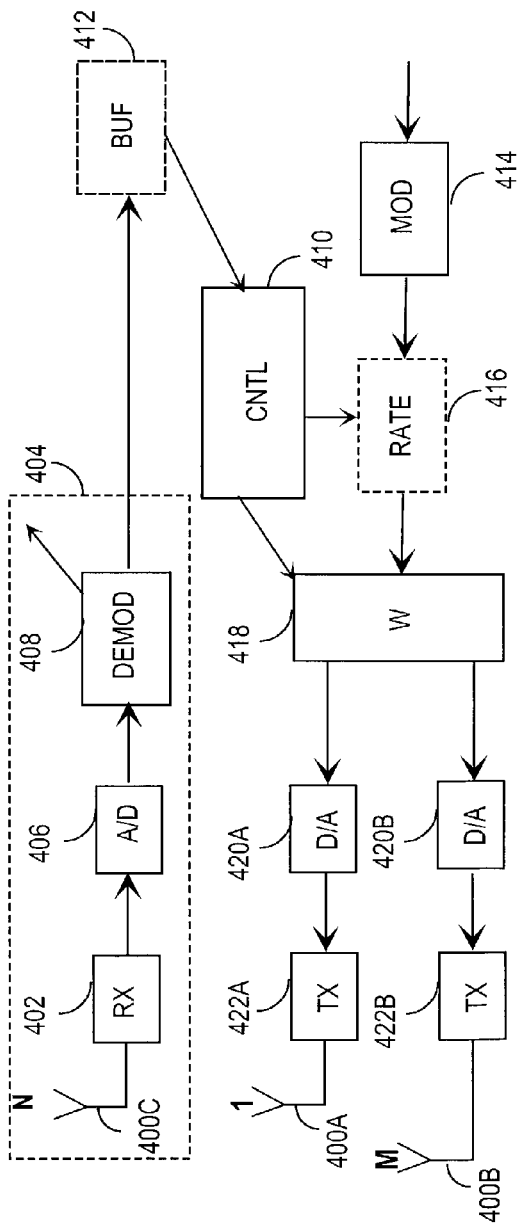

Next, the special features of transmitter structures required to implement the different embodiments of the method of increasing spectral efficiency presented herein will be presented in detail by means of FIGS. 4a–b.

FIG. 4a illustrates the structure of a transmitter of a network part in a radio system, with no weighing of the input signals of the antennas. It should also be noted that in the simplest embodiment of the invention, no means 412 are needed for storing the quality class observations made by the terminal from the signal received from the network part and for statistical prognosis of the following transition.

In the embodiment of FIG. 4a, a control block 410 controls means 416 for selecting the rate for selecting a suitable transfer rate taking the quality of the connection into account. If the connection is bad, a lower transfer rate is used. However, the method can also be utilized without the means 416 for selecting the transfer rate. The transfer rate can also be affected with the number of antenna elements used for transmission: the more antenna elements are usable for transmission, the higher is the transfer rate achieved. When the channel is bad, packet data can also be retransmitted a sufficient number of times. The control block 410 also controls RF parts 422 and thereby the selection of the antenna elements 400a–b, in order for a sufficiently bad channel to be left entirely unused until information about an improvement in the state of the channel is received from the subscriber terminal. However, if the channel is fit for transfer, the transfer connection can be improved by raising transmission power. However, in raising power, it should be born in mind that it causes an increasing amount of interference to other channels.

FIG. 4b illustrates the structure of a transceiver of a network part in a radio system, when the input signals of antenna elements are multiplied by weighting coefficients selected in weighting means. The structure and function of the transceiver correspond to the weighting means and except fro the number of RF parts the situation shown in FIG. 4a, so only those structural parts will be described herein that are different in FIG. 4b than in 4a.

In the weighting means 418, a signal going to each antenna element is multiplied by a typically complex coefficient corresponding to each antenna element. Thereby, in digital phasing, the antenna beam can be directed in the direction of a complex vector formed by elements or by selecting the weighting coefficient zero, one or more antennas can be left unused. The control block 410 controls the operation of the weighting means on the basis of quality class information obtained from the subscriber terminal.

The control block 410 also controls RF parts 422a–b and thereby the selection of antenna elements 400a–b, in order that a sufficiently bad channel can be left totally unused until information about an improvement in the state of the channel is received from the subscriber terminal. However, if the channel is fit for transfer, the transfer connection can be improved by increasing transmission power. However, in raising power, it should be born in mind that it causes an increasing amount of interference to other channels.

The above-described functionalities of a network part of a radio system, such as a base station or a transceiver, e.g. the control block, the transfer rate selection means and the weighting means, can be implemented in many ways, for example with software executed with a processor or a hardware implementation, such as logics circuits built of separate components or ASIC.

Although the invention is described above with reference to examples according to the accompanying drawings, it is apparent that the invention is not limited thereto, but can be modified in a variety of ways within the scope of the inventive idea disclosed in the attached claims.

We claim:

1. A data transfer method in a radio system comprising a first transceiver and a second transceiver, of which at least the first transceiver comprises a multiple antenna system, in which method a signal transmitted by the first transceiver is measured by the second transceiver, and in which method one or more threshold values are set on the performance of a transfer channel, the method comprising comparing a parameter value representing the quality of the signal measured by the second transceiver from the signal it received with one or more threshold values, and thus determining a quality class for the performance of a Multiple Input—Multiple Output common channel, coding the determined quality class by the second transceiver, the second transceiver transmitting information on the quality class to the first transceiver, storing the observations made by the second transceiver about the quality class transitions of the transfer channel of the first transceiver, estimating the next quality class of the transfer channel of the first transceiver from the stored quality class transition observations, and determining the transmit parameters of the antenna elements of the multiple antenna system used by the first transceiver for transmission based on the estimate, wherein a transfer rate of the transmission of the first transceiver is determined by means of the quality class information.

2. The method as claimed in claim 1 wherein the first transceiver is a network part in the radio system and the second transceiver is a subscriber terminal.

3. The method as claimed in claim 1 wherein the first transceiver is a subscriber terminal and the second transceiver is a network part in the radio system.

4. The method as claimed in claim 1, wherein a transmit power of the antenna elements in the multiple antenna system used by the first transceiver for transmission is determined based on the quality class information.

5. The method as claimed in claim 1, wherein a power of the signal received by the second transceiver is measured as the parameter representing quality.

6. The method as claimed in claim 1, wherein a bit error ratio of the signal received by the second transceiver is measured as the parameter representing quality.

7. The method as claimed in claim 1, wherein a signal-to-interference ratio of the signal received by the second transceiver is measured as the parameter representing quality.

8. The method as claimed in claim 1 wherein the caused interference is reduced by not using radio channels of a bad quality class for the transmission of the transmitter.

9. The method as claimed in claim 1, wherein a suitable diversity combination for the transmission of the first transceiver is determined by means of the quality class information.

10. The method as claimed in claim 1 wherein a transmit power of the antenna elements in the multiple antenna system is determined used by the first transceiver for transmission based on the estimate.

11. The method as claimed in claim 1 wherein a bit error ratio of the signal received by the second transceiver is measured as the parameter representing quality.

12. The method as claimed in claim 1 wherein a signal-to-interference ratio of the signal received by the second transceiver is measured as a the parameter representing quality.

13. The method as claimed in claim 1 wherein a suitable diversity combination for the transmission of the first transceiver is determined by means of the estimate.

14. A data transfer method in a radio system comprising a first transceiver and a second transceiver, of which at least the first transceiver comprises a multiple antenna system, in which method a signal transmitted by the first transceiver is measured by the second transceiver, and in which method one or more threshold values are set on the performance of a transfer channel, the method comprising:
    comparing a parameter value representing the quality of the signal measured by the second transceiver from the signal it received with one or more threshold values, and thus determining a quality class for the performance of a Multiple Input—Multiple Output common channel,
    coding the determined quality class by the second transceiver,
    the second transceiver transmitting information on the quality class to the first transceiver,
    storing the observations made by the second transceiver about the quality class transitions of the transfer channel of the first transceiver,
    estimating the next quality class of the transfer channel of the first transceiver from the stored quality class transition observations, and
    determining the transmit parameters of the antenna elements of the multiple antenna system used by the first transceiver for transmission based on the estimate,
    wherein the order of data packets to be transmitted is determined by means of the quality class information.

15. A data transfer method in a radio system comprising a first transceiver and a second transceiver, of which at least the first transceiver comprises a multiple antenna system, in which method a signal transmitted by the first transceiver is measured by the second transceiver, and in which method one or more threshold values are set on the performance of a transfer channel, the method comprising:
    comparing a parameter value representing the quality of the signal measured by the second transceiver from the signal it received with one or more threshold values, and thus determining a quality class for the performance of a Multiple Input Multiple Output common channel,
    coding the determined quality class by the second transceiver,
    the second transceiver transmitting information on the quality class to the first transceiver,
    storing the observations made by the second transceiver about the quality class transitions of the transfer channel of the first transceiver,
    estimating the next quality class of the transfer channel of the first transceiver from the stored quality class transition observations, and
    determining the transmit parameters of the antenna elements of the multiple antenna system used by the first transceiver for transmission based on the estimate,
    wherein a suitable modulation method for the transmission of the first transceiver is selected by means of the quality class information.

16. A data transfer method in a radio system comprising a first transceiver and a second transceiver, of which at least the first transceiver comprises a multiple antenna system, in which method a signal transmitted by the first transceiver is measured by the second transceiver, and in which method one or more threshold values are set on the performance of a transfer channel, the method comprising:
    comparing a parameter value representing the quality of the signal measured by the second transceiver from the signal it received with one or more threshold values, and thus determining a quality class for the performance of a Multiple Input—Multiple Output common channel,
    coding the determined quality class by the second transceiver,
    the second transceiver transmitting information on the quality class to the first transceiver,
    storing the observations made by the second transceiver about the quality class transitions of the transfer channel of the first transceiver,
    estimating the next quality class of the transfer channel of the first transceiver from the stored quality class transition observations, and
    determining the transmit parameters of the antenna elements of the multiple antenna system used by the first transceiver for transmission based on the estimate,
    wherein a suitable coding method for the transmission of the first transceiver is selected by means of the quality class information.

17. A data transfer method in a radio system comprising a first transceiver and a second transceiver, of which at least the first transceiver comprises a multiple antenna system, in which method a signal transmitted by the first transceiver is measured by the second transceiver, and in which method one or more threshold values are set on the performance of a transfer channel, the method comprising
    comparing a parameter value representing the ciualitv of the signal measured by the second transceiver from the signal it received with one or more threshold values, and thus determining a quality class for the performance of a Multiple Input—Multiple Output common channel, coding the determined quality class by the second transceiver, the second transceiver transmitting information on the quality class to the first transceiver, storing the observations made by the second transceiver about the quality class transitions of the transfer channel of the first transceiver.

estimating the next quality class of the transfer channel of the first transceiver from the stored quality class transition observations, and determining the transmit parameters of the antenna elements of the multiple antenna system used by the first transceiver for transmission based on the estimate, wherein a suitable coding depth for the transmission of the first transceiver is selected by means of the quality class information.

18. A data transfer method in a radio system comprising a first transceiver and a second transceiver, of which at least the first transceiver comprises a multiple antenna system, in which method a signal transmitted by the first transceiver is measured by the second transceiver, and in which method one or more threshold values are set on the performance of a transfer channel, the method comprising comparing a parameter value representing the quality of the signal measured by the second transceiver from the signal it received with one or more threshold values, and thus determining a quality class for the performance of a Multiple Input—Multiple Output common channel, coding the determined quality class by the second transceiver, the second transceiver transmitting information on the quality class to the first transceiver, storing the observations made by the second transceiver about the quality class transitions of the transfer channel of the first transceiver, estimating the next quality class of the transfer channel of the first transceiver from the stored quality class transition observations, and determining the transmit parameters of the antenna elements of the multiple antenna system used by the first transceiver for transmission based on the estimate, wherein a transfer rate of the transmission of the first transceiver is determined by means of the estimate.

19. A data transfer method in a radio system comprising a first transceiver and a second transceiver, of which at least the first transceiver comprises a multiple antenna system, in which method a signal transmitted by the first transceiver is measured by the second transceiver, and in which method one or more threshold values are set on the performance of a transfer channel, the method comprising:

comparing a parameter value representing the quality of the signal measured by the second transceiver from the signal it received with one or more threshold values, and thus determining a quality class for the performance of a Multiple Input—Multiple Output common channel, coding the determined quality class by the second transceiver, the second transceiver transmitting information on the quality class to the first transceiver, storing the observations made by the second transceiver about the quality class transitions of the transfer channel of the first transceiver, estimating the next quality class of the transfer channel of the first transceiver from the stored quality class transition observations, and determining the transmit parameters of the antenna elements of the multiple antenna system used by the first transceiver for transmission based on the estimate, wherein the order of data packets to be transmitted is determined by means of the estimate.

20. A data transfer method in a radio system comprising a first transceiver and a second transceiver, of which at least the first transceiver comprises a multiple antenna system, in which method a signal transmitted by the first transceiver is measured by the second transceiver, and in which method one or more threshold values are set on the performance of a transfer channel, the method comprising:

comparing a parameter value representing the quality of the signal measured by the second transceiver from the signal it received with one or more threshold values, and thus determining a quality class for the performance of a Multiple Input—Multiple Output common channel, coding the determined quality class by the second transceiver, the second transceiver transmitting information on the quality class to the first transceiver, storing the observations made by the second transceiver about the quality class transitions of the transfer channel of the first transceiver, estimating the next quality class of the transfer channel of the first transceiver from the stored quality class transition observations, and determining the transmit parameters of the antenna elements of the multiple antenna system used by the first transceiver for transmission based on the estimate, wherein a suitable modulation method for the transmission of the first transceiver is selected by means of the estimate.

21. A data transfer method in a radio system comprising a first transceiver and a second transceiver, of which at least the first transceiver comprises a multiple antenna system, in which method a signal transmitted by the first transceiver is measured by the second transceiver, and in which method one or more threshold values are set on the performance of a transfer channel, the method comprising:

comparing a parameter value representing the quality of the signal measured by the second transceiver from the signal it received with one or more threshold values, and thus determining a quality class for the performance of a Multiple Input—Multiple Output common channel, coding the determined quality class by the second transceiver, the second transceiver transmitting information on the quality class to the first transceiver, storing the observations made by the second transceiver about the quality class transitions of the transfer channel of the first transceiver, estimating the next quality class of the transfer channel of the first transceiver from the stored quality class transition observations, and determining the transmit parameters of the antenna elements of the multiple antenna system used by the first transceiver for transmission based on the estimate, wherein a suitable coding method for the transmission of the first transceiver is selected by means of the estimate.

22. A data transfer method in a radio system comprising a first transceiver and a second transceiver, of which at least the first transceiver comprises a multiple antenna system, in which method a signal transmitted by the first transceiver is measured by the second transceiver, and in which method one or more threshold values are set on the performance of a transfer channel, the method comprising comparing a parameter value representing the ciuality of the signal measured by the second transceiver from the signal it received with one or more threshold values, and thus determining a ciuality class for the performance of a Multiple Input—Multiple Output common channel, coding the determined quality class by the second transceiver, the second transceiver transmitting information on the quality class to the first transceiver, storing the observations made by the second transceiver about the quality class transitions of the transfer channel of the first transceiver, estimating the next quality class of the transfer channel of the first transceiver from the stored quality class transition observations, and determining the transmit parameters of the antenna elements of the multiple antenna system used by the first transceiver for transmission based on the estimate, wherein a suitable coding depth for the transmission of the first transceiver is selected by means of the estimate.

23. The radio system comprising a first transceiver having an associated multiple antenna system, in which radio system a second transceiver comprises means for measuring a received signal, and in which radio system at least one threshold value is set on the performance of a transfer channel, the second transceiver further comprising means for comparing a parameter representing signal quality measured from the received signal with at least one threshold value, means for determining a quality class for the performance of a Multiple Input—Multiple Output common channel, means for encoding the determined quality class, means for transmitting quality class information or a quality class estimate to the first transceiver, at least one of the transceivers further comprising means for storing the observations made by the second transceiver about the quality class transitions of the transfer channel of the first transceiver, means for estimating the next quality class of the transfer channel of the first transceiver from the stored quality class transition observations, the first transceiver further comprising means for determining the transmit parameters of the antenna elements of the multiple antenna system used by the first transceiver for transmission based on the quality class, wherein the first transceiver comprises means for determining the transfer rate of the transmission by means of the quality class information.

24. The system as claimed in claim 23, wherein the first transceiver is a network part in the radio system and the second transceiver is a subscriber terminal.

25. The system as claimed in claim 23, therein the first transceiver is a subscriber terminal and the second transceiver is a network part in the radio system.

26. The system as claimed in claim 23, wherein the first transceiver comprises means for determining the transmit power of the antenna elements in the multiple antenna system based on the quality class information.

27. The system as claimed in claim 23, wherein the second transceiver comprises means for measuring the power of the received signal as the parameter representing quality.

28. The system as claimed in claim 23, wherein the second transceiver comprises means for measuring the bit error ratio of the received signal as the parameter representing quality.

29. The system as claimed in claim 23, wherein the second transceiver comprises means for measuring the signal-to-interference ratio of the received signal as the parameter representing quality.

30. The system as claimed in claim 23, wherein the first transceiver comprises means for determining a suitable diversity combination for the transmission by means of the quality class information.

31. The system as claimed in claim 23, wherein first transceiver comprises means for determining the transmit power of the antenna elements in the multiple antenna system based on the estimate.

32. The system as claimed in claim 23, wherein the second transceiver comprises means for measuring the power of the received signal as the parameter representing quality.

33. The system as claimed in claim 23, wherein the second transceiver comprises means for measuring the bit error ratio of the received signal as the parameter representing quality.

34. The system as claimed in claim 23, wherein the second transceiver comprises means for measuring the signal-to-interference ratio of the received signal as the parameter representing quality.

35. The system as claimed in claim 23, wherein the first transceiver comprises means for determining a suitable diversity combination for the transmission by means of the estimate.

36. A radio system comprising a first transceiver having an associated multiple antenna system, in which radio system a second transceiver comprises means for measuring a received signal, and in which radio system at least one threshold value is set on the performance of a transfer channel, the second transceiver further comprising:

means for comparing a parameter representing signal quality measured from the received signal with at least one threshold value, means for determining a quality class for the performance of a Multiple Input—Multiple Output common channel, means for encoding the determined quality class, means for transmitting quality class information or a quality class estimate to the first transceiver, at least one of the transceivers further comprising:

means for storing the observations made by the second transceiver about the quality class transitions of the transfer channel of the first transceiver, means for estimating the next quality class of the transfer channel of the first transceiver from the stored quality class transition observations, the first transceiver further comprising
means for determining the transmit parameters of the antenna elements of the multiple antenna system used by the first transceiver for transmission based on the quality class,
wherein the first transceiver comprises means for determining the order of the data packets to be transmitted by means of the quality class information.

37. A radio system comprising a first transceiver having an associated multiple antenna system, in which radio system a second transceiver comprises means for measuring a received signal, and in which radio system at least one threshold value is set on the performance of a transfer channel,
the second transceiver further comprising:
means for comparing a parameter representing signal quality measured from the received signal with at least one threshold value,
means for determining a quality class for the performance of a Multiple Input—Multiple Output common channel,
means for encoding the determined quality class,
means for transmitting quality class information or a quality class estimate to the first transceiver,
at least one of the transceivers further comprising
means for storing the observations made by the second transceiver about the quality class transitions of the transfer channel of the first transceiver,
means for estimating the next quality class of the transfer channel of the first transceiver from the stored quality class transition observations,
the first transceiver further comprising
means for determining the transmit parameters of the antenna elements of the multiple antenna system used by the first transceiver for transmission based on the quality class,
wherein the first transceiver comprises means for selecting a suitable modulation method for the transmission by means of the quality class information.

38. A radio system comprising a first transceiver having an associated multiple antenna system, in which radio system a second transceiver comprises means for measuring a received signal, and in which radio system at least one threshold value is set on the performance of a transfer channel,
the second transceiver further comprising:
means for comparing a parameter representing signal quality measured from the received signal with at least one threshold value,
means for determining a quality class for the performance of a Multiple Input—Multiple Output common channel,
means for encoding the determined quality class,
means for transmitting quality class information or a quality class estimate to the first transceiver,
at least one of the transceivers further comprising
means for storing the observations made by the second transceiver about the quality class transitions of the transfer channel of the first transceiver,
means for estimating the next quality class of the transfer channel of the first transceiver from the stored quality class transition observations,
the first transceiver further comprising:
means for determining the transmit parameters of the antenna elements of the multiple antenna system used by the first transceiver for transmission based on the quality class,
wherein the first transceiver comprises means for selecting a suitable coding method for the transmission by means of the quality class information.

39. A radio system comprising a first transceiver having an associated multiple antenna system, in which radio system a second transceiver comprises means for measuring a received signal, and in which radio system at least one threshold value is set on the performance of a transfer channel,
the second transceiver further comprising
means for comparing a parameter representing signal quality measured from the received signal with at least one threshold value.
means for determining a quality class for the performance of a Multiple Input—Multiple Output common channel.
means for encoding the determined quality class,
means for transmitting quality class information or a quality class estimate to the first transceiver,
at least one of the transceivers further comprising
means for storing the observations made by the second transceiver about the quality class transitions of the transfer channel of the first transceiver,
means for estimating the next quality class of the transfer channel of the first transceiver from the stored quality class transition observations,
the first transceiver further comprising
means for determining the transmit parameters of the antenna elements of the multiple antenna system used by the first transceiver for transmission based on the quality class,
wherein the first transceiver comprises means for selecting a suitable coding depth for the transmission by means of the quality class information.

40. A radio system comprising a first transceiver having an associated multiple antenna system, in which radio system a second transceiver comprises means for measuring a received signal, and in which radio system at least one threshold value is set on the perfonnance of a transfer channel,
the second transceiver further comprising
means for comparing a parameter representing signal ciuality measured from the received signal with at least one threshold value.
means for determining a quality class for the performance of a Multiple Input—Multiple Output common channel,
means for encoding the determined quality class.
means for transmitting quality class information or a quality class estimate to the first transceiver,
at least one of the transceivers further comprising
means for storing the observations made by the second transceiver about the quality class transitions of the transfer channel of the first transceiver,
means for estimating the next quality class of the transfer channel of the first transceiver from the stored quality class transition observations,
the first transceiver further comprising
means for determining the transmit parameters of the antenna elements of the multiple antenna system used by the first transceiver for transmission based on the quality class,
wherein the first transceiver comprises means for determining the transfer rate of the transmission by means of the estimate.

41. A radio system comprising a first transceiver having an associated multiple antenna system, in which radio system a second transceiver comprises means for measuring a received signal, and in which radio system at least one threshold value is set on the performance of a transfer channel, the second transceiver further comprising:
means for comparing a parameter representing signal quality measured from the received signal with at least one threshold value,
means for determining a quality class for the performance of a Multiple Input—Multiple Output common channel,
means for encoding the determined quality class,
means for transmitting quality class information or a quality class estimate to the first transceiver,
at least one of the transceivers further comprising:
means for storing the observations made by the second transceiver about the quality class transitions of the transfer channel of the first transceiver,
means for estimating the next quality class of the transfer channel of the first transceiver from the stored quality class transition observations,
the first transceiver further comprising:
means for determining the transmit parameters of the antenna elements of the multiple antenna system used by the first transceiver for transmission based on the quality class,
wherein the first transceiver comprises means for determining the order of the data packets to be transmitted by means of the estimate.

42. A radio system comprising a first transceiver having an associated multiple antenna system, in which radio system a second transceiver comprises means for measuring a received signal, and in which radio system at least one threshold value is set on the performance of a transfer channel, the second transceiver further comprising:
means for comparing a parameter representing signal quality measured from the received signal with at least one threshold value,
means for determining a quality class for the performance of a Multiple Input—Multiple Output common channel,
means for encoding the determined quality class,
means for transmitting quality class information or a quality class estimate to the first transceiver,
at least one of the transceivers further comprising:
means for storing the observations made by the second transceiver about the quality class transitions of the transfer channel of the first transceiver,
means for estimating the next quality class of the transfer channel of the first transceiver from the stored quality class transition observations,
the first transceiver further comprising
means for determining the transmit parameters of the antenna elements of the multiple antenna system used by the first transceiver for transmission based on the quality class,
wherein the first transceiver comprises means for selecting a suitable modulation method for the transmission by means of the estimate.

43. A radio system comprising a first transceiver having an associated multiple antenna system, in which radio system a second transceiver comprises means for measuring a received signal, and in which radio system at least one threshold value is set on the performance of a transfer channel, the second transceiver further comprising:
means for comparing a parameter representing signal quality measured from the received signal with at least one threshold value,
means for determining a quality class for the performance of a Multiple Input—Multiple Output common channel,
means for encoding the determined quality class,
means for transmitting quality class information or a quality class estimate to the first transceiver,
at least one of the transceivers further comprising:
means for storing the observations made by the second transceiver about the quality class transitions of the transfer channel of the first transceiver,
means for estimating the next quality class of the transfer channel of the first transceiver from the stored quality class transition observations,
the first transceiver further comprising:
means for determining the transmit parameters of the antenna elements of the multiple antenna system used by the first transceiver for transmission based on the quality class,
wherein the first transceiver comprises means for selecting a suitable coding method for the transmission by means of the estimate.

44. A radio system comprising a first transceiver having an associated multiple antenna system, in which radio system a second transceiver comprises means for measuring a received signal, and in which radio system at least one threshold value is set on the performance of a transfer channel, the second transceiver further comprising
means for comparing a parameter representing signal quality measured from the received signal with at least one threshold value,
means for determining a quality class for the performance of a Multiple Input—Multiple Output common channel,
means for encoding the determined quality class,
means for transmitting quality class information or a quality class estimate to the first transceiver,
at least one of the transceivers further comprising
means for storing the observations made by the second transceiver about the quality class transitions of the transfer channel of the first transceiver,
means for estimating the next quality class of the transfer channel of the first transceiver from the stored quality class transition observations,
the first transceiver further comprising
means for determining the transmit parameters of the antenna elements of the multiple antenna system used by the first transceiver for transmission based on the quality class,
wherein the first transceiver comprises means for selecting a suitable coding depth for the transmission by means of the estimate.

45. A data transfer method in a radio system comprising a first transceiver and a second transceiver, of which at least the first transceiver comprises a multiple antenna system, in which method a signal transmitted by the first transceiver is measured by the second transceiver, and in which method one or more threshold values are set on the performance of a transfer channel, the method comprising
comparing a parameter value representing the quality of the signal measured by the second transceiver from the signal it received with one or more threshold values, and thus determining a quality class for the performance of a Multiple Input—Multiple Output common channel, coding the determined quality class by the second transceiver, storing the observations made by the second transceiver about the quality class transitions of the transfer channel of the first transceiver, estimating the next quality class of the transfer channel of the first transceiver from the stored quality class transition observations, the second transceiver transmitting the quality class estimate to the first transceiver, and determining the transmit parameters of the antenna elements of the multiple antenna system used by the first transceiver for transmission based on the estimate, wherein a suitable coding depth for the transmission of the first transceiver is selected by means of the estimate.

* * * * *